(12) United States Patent
Takemoto

(10) Patent No.: US 6,211,973 B1
(45) Date of Patent: Apr. 3, 2001

(54) COLOR TRANSFORMING METHOD

(75) Inventor: Fumito Takemoto, Kanagawa (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/926,982

(22) Filed: Sep. 10, 1997

(30) Foreign Application Priority Data

Sep. 10, 1996 (JP) .................................................. 8-239043

(51) Int. Cl.$^7$ ...................................................... H04N 1/46
(52) U.S. Cl. ......................... 358/515; 358/518; 382/167
(58) Field of Search .................................. 358/504, 515, 358/516, 518, 523, 535, 505, 520, 529, 530; 382/167, 162

(56) References Cited

U.S. PATENT DOCUMENTS

| | | | |
|---|---|---|---|
| 4,446,470 | * 5/1984 | Sugiyama et al. | 346/140 |
| 4,939,581 | * 7/1990 | Shalit | 386/128 |
| 5,115,229 | * 5/1992 | Shalit | 345/1 |
| 5,363,218 | * 11/1994 | Hoshino | 358/518 |
| 5,416,613 | * 5/1995 | Rolleston et al. | 358/518 |
| 5,528,386 | * 6/1996 | Rolleston et al. | 358/522 |
| 5,594,557 | * 1/1997 | Rolleston et al. | 358/518 |
| 5,612,902 | * 3/1997 | Stokes | 702/85 |
| 5,710,871 | * 1/1998 | Tadenuma et al. | 395/109 |
| 5,734,800 | * 3/1998 | Herbert et al. | 395/109 |
| 5,754,448 | * 5/1998 | Edge et al. | 364/526 |
| 5,809,366 | * 9/1998 | Yamakawa et al. | 399/39 |
| 5,987,168 | * 11/1999 | Decker et al. | 382/167 |

* cited by examiner

*Primary Examiner*—Edward Coles
*Assistant Examiner*—Mark Wallerson
(74) *Attorney, Agent, or Firm*—Sughrue, Mion, Zinn, Macpeak & Seas, PLLC

(57) ABSTRACT

According to the improved method of transforming device-taken color/density data to calorimetric values, color/density data obtained by imaging with a device are transformed to calorimetric values by the steps of correcting device data with correction data to construct setting data, the device data being obtained by imaging with the device in the actual scene a color chart having patches formed thereon in a plurality of colors/densities, and the correction data being obtained by imaging an achromatic chart having achromatic patches formed thereon with the device under the same conditions as the color chart; measuring the color chart with an instrument to provide reference data; setting color transforming conditions from the reference data and the setting data for transforming the color/density data to calorimetric values; and transforming the device-taken color/density data to calorimetric values using the color transforming conditions.

8 Claims, 1 Drawing Sheet

COLOR TRANSFORMING METHOD

BACKGROUND OF THE INVENTION

This invention relates to the art of device characterization for digital cameras, digital video cameras and other image pickup devices.

Device characterization, or the technique of reproducing identical images from the same scene or original image independently of the image pickup or output device employed, is recently recommended for adoption in color management areas.

Characterization is intended to achieve device-independent image reproduction or produce a uniform image from the same scene or original image independently of the type or mode of an image pickup device such as a digital camera or digital video camera or an image output device such as a display or image recording apparatus. To this end, image data are dealt with not as color/density data but as standard signals specified by the International Commission on Illumination (Commission Internationale de 1' Éclairage—CIE), for example, calorimetric data in the XYZ color system.

Therefore, in order to perform characterization, color/density image data such as those of red (R), green (G), blue (B), etc. that are incorporated (imaged or read) with image pickup devices such as digital cameras and digital video cameras have to be transformed to calorimetric data in the CIE 1931 XYZ, CIE 1976 L*a*b* and other CIE standard colorimetric systems. This transformation is usually performed by employing preset color transforming conditions, specifically, preset color transforming matrices or lookup tables (LUTs). Such color transforming conditions are constructed typically by applying a known method such as the method of least squares to two kinds of data, one being device data (i.e., the data of a color chart imaged with a device of interest) and target (i.e., reference data or the actual values obtained from the same color chart by measurement with an instrument such as a spectrophotometer).

Since the output image data from digital cameras and digital video cameras differ from one imaging light source to another, the color transforming conditions such as those in a matrix or LUT form have to be constructed for each of A the imaging light source used. Stated more specifically, a color chart in the actual scene is imaged with a digital camera to obtain the device data and measured with an instrument such as a gun-type spectrophotometer to obtain the reference data, and the resulting device data and reference data are processed to set the necessary color transforming conditions. However, making the measurement of the color chart for each instance of imaging is quite cumbersome and time-consuming and, hence, is not efficient. Particularly, measurement of the reference data by using, for example, a gun-type instrument is very time-consuming.

One may think of dealing with this problem by preliminarily measuring the spectral data of the color chart with, for example, a desktop spectrophotometer, calculating the reference data from this spectral data of the color chart and the spectral data of the imaging light source and setting the necessary color transforming conditions on the basis of the calculated reference data. This method is capable of constructing the color transforming conditions by far more easily and quickly than when the reference data are measured in the actual scene. However, compared to the device data taken in the actual scene which are subject to various effects such as those caused by the position of the imaging light source and the unevenness in the quantity of light it issues, the reference data of measurement with instruments are uniform in the entire absence of such external effects. Even if the reference data obtained from the measured data are used to construct color transforming conditions, the precision in transformation is too low to achieve the correct transformation of color/density data to colorimetric data, thus failing to perform the intended characterization.

SUMMARY OF THE INVENTION

The present invention has been accomplished under these circumstances and has as an object providing a method of transforming color/density data such as image data of R, G, B, etc. to colorimetric data which, despite the use of a desktop spectrophotometer or the like, eliminates the effects of the imaging light source (e.g. its position and the unevenness in the quantity of light it issues) which will be caused on the device data in the actual scene, thereby allowing for rapid and easy construction of highly precise color transforming conditions such as those in a matrix and LUT form, which may be utilized to enable the characterization of the device of interest in a highly satisfactory way.

The stated object of the invention can be attained by a method of transforming device-taken color/density data to calorimetric values, in which color/density data obtained by imaging with a device are transformed to colorimetric values by the steps of: correcting device data with correction data to construct setting data, said device data being obtained by imaging with the device in the actual scene a color chart having patches formed thereon in a plurality of colors/densities, and said correction data being obtained by imaging an achromatic chart having achromatic patches formed thereon with the device under the same conditions as said color chart; measuring said color chart with an instrument to provide reference data; setting color transforming conditions from said reference data and said setting data for transforming the color/density data to calorimetric values; and transforming the device-taken color/density data to calorimetric values using said color transforming conditions.

Preferably, the color chart is a Macbeth color checker, the achromatic chart is a gray chart that has gray patches of the same layout and size as the color patches of the color chart and the gray patches of a uniform density formed thereon, the device data and the correction data are a luminance value, and the instrument is a desktop spectrophotometer.

It is prefered that the reference data is determined in such a way that using a prescribed whitecard as a reference, spectral data are obtained for each of the patches on a Macbeth chart as the color chart by measurement with the instrument, the obtained spectral data and spectral data for an imaging light source in the actual scene to be imaged with the device are substituted into following equations to calculate calorimetric values XYZ, and the thus calculated colorimetric values XYZ are transformed to calorimetric values L*a*b* by a CIE specified method.

$$X = k\Sigma O(\lambda)S(\lambda)\bar{x}(\lambda)\Delta\lambda$$

$$Y = k\Sigma O(\lambda)S(\lambda)\bar{y}(\lambda)\Delta\lambda$$

$$Z = k\Sigma O(\lambda)S(\lambda)\bar{z}(\lambda)\Delta\lambda$$

where $k = 100/\Sigma S(\lambda)\bar{y}(\lambda)\Delta\lambda$ $O(\lambda)$: spectral data for each of the patches on Macbeth chart $S(\lambda)$: spectral data for the imaging light soruce $\bar{x}(\lambda), \bar{y}(\lambda), \bar{z}(\lambda)$: color—matching functions It is also preferred that the color transforming condition is a color transforming matrix or a color transforming lookup table, and that the setting step of the color transforming condition is performed using a method of least squares.

DETAILED DESCRIPTION OF THE INVENTION

Figure 1:
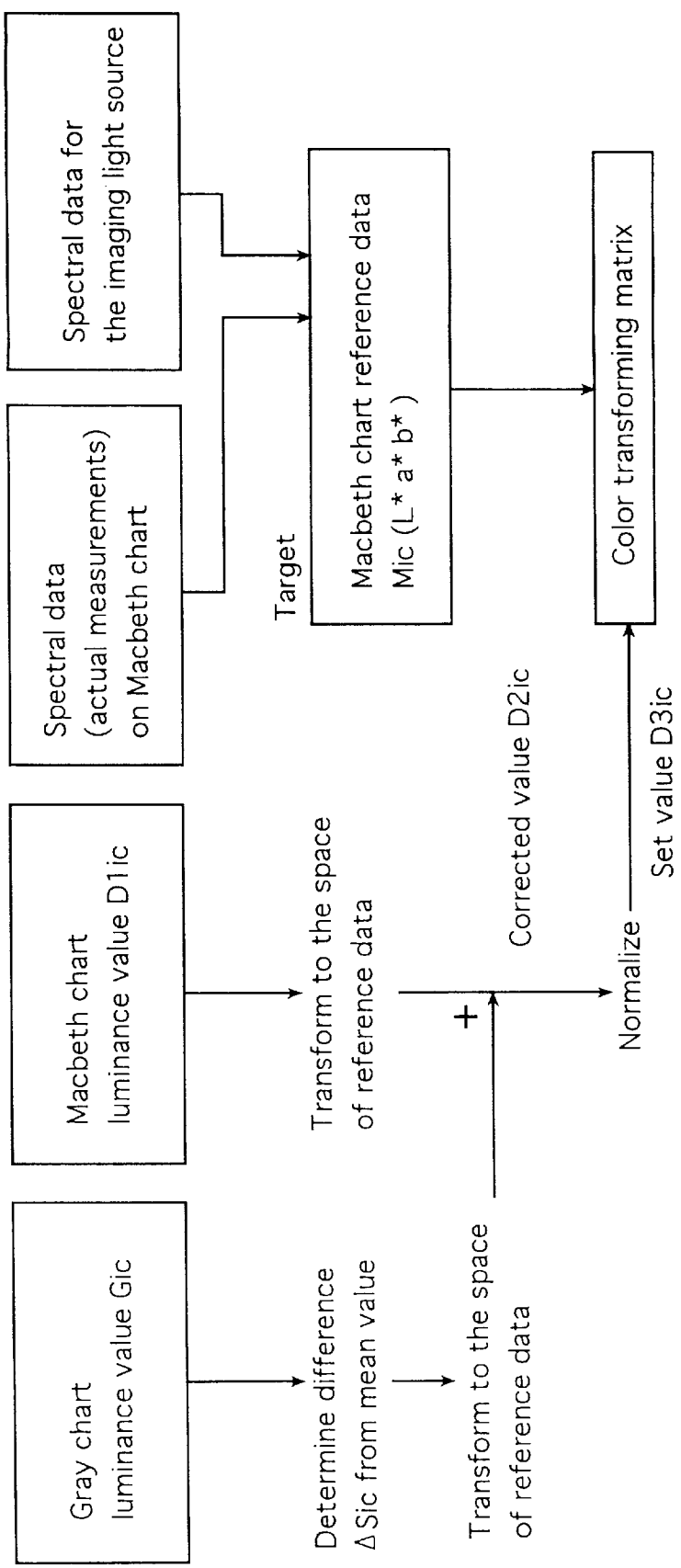
FIG. 1 is a diagram showing the concept of one example of the procedure of setting color transforming conditions in the color transforming method of the invention.

The color transforming method of the invention will now be described in detail with reference to the preferred embodiment shown in the accompanying drawing.

In the color transforming method of the invention, device data obtained by imaging a color chart in the actual scene with an image pickup device such as a digital camera or a digital video camera is processed with correction data obtained by imaging achromatic patches with the device under the same conditions as those employed for imaging the individual patches on the color chart, thereby producing setting data which is identical to the device data except that the effects of the position of the imaging light source (lighting), uneven light quantity, etc. have been eliminated, and said setting data are employed to set color transforming conditions in the form of a matrix, lookup table (LUT), etc.

Accordingly, even if reference data (target) are calculated from data obtained by measuring the color chart with an instrument such as a desktop spectrophotometer, highly precise color transforming conditions in the form of a matrix, LUT, etc. can be set in various types of scenes since the device data are preliminarily freed of the effect of unevenness in the quantity of light from the imaging light source and other effects thereof. Therefore, by employing the thus set highly precise color transforming conditions, highly precise color transformation and, hence, satisfactory characterization of the device can be accomplished.

The color chart suitable for use in the color transforming method of the invention is not limited in any particular way and it may be of any types that have a plurality of color and achromatic patches formed in different colors and densities to permit the setting of the desired color transforming conditions. Thus, in the present invention, various known types of color charts that satisfy this requirement may be used and a suitable example is a Macbeth color checker (hereinafter referred to as a "Macbeth chart") produced by Macbeth A Division of Kollmorgen Corporation, USA). The Macbeth chart is a color chart composed of a total of 24 patches, six of which are gray patches of different densities and the remainder being patches of the three primaries for additive mixing (blue (B), green (G) and red (R)) and those for subtractive mixing (yellow (Y), magenta (M) and cyan (C)), each having a plurality of densities.

Speaking of the gray chart having achromatic (gray) patches formed thereon, various types are useful as long as they permit the gray patches to be imaged under the same conditions as for the respective patches on the color chart when the actual scene is taken with a device or if they provide correction data which represent the imaging under the same conditions. An example is a gray chart that has gray patches of the same layout and size as the patches of the color chart and which has gray patches of a uniform density formed thereon. Alternatively, one or more gray patches of the same shape as the patches formed on the color chart may be placed on the same position as each of the patches in the color chart, and the thus formed chart may be used as a gray chart for determining the correction data. If desired, a combined chart having, in addition to color patches, gray patches formed at the four corners of the color chart may be used to measure both the color and gray patches. Interpolation or some other suitable techniques may be employed to calculate the correction data due to the gray patches in the positions corresponding to the respective color patches.

The color transformation method of the invention which uses the above-defined color and gray charts will now be described in greater detail with reference to FIG. 1 for the case where the color chart is a Macbeth chart and the gray chart is one having the same layout and size as the Macbeth chart and which has 24 gray charts formed at uniform density.

First, the Macbeth chart covered with a sheet of black paper on the four sides is placed within the scene of interest at a suitable position and imaged with a device; the imaging data are then incorporated into a processing apparatus such as a computer and the necessary processing is performed to provide device data for each of the patches on the chart (i.e., R, G and B values of each patch).

Thereafter, the gray chart also covered with a sheet of black paper on the four sides is placed within the scene at the same position as the Macbeth chart and imaged with the device, followed by similar procedures to provide correction data. Needless to say, the gray chart may be imaged before the Macbeth chart.

The output data from the device is the data characteristic of device and has been corrected according to the device. Therefore, the output data is transformed to numeric values of luminance proportional to the quantity of light, namely, the luminance of the device data $D1_{ic}$ and the luminance of the correction data $G_{ic}$. In each designation of luminance, i refers to the patch number and c identifies which color of R, G and B is represented by the data of interest.

Luminance values may be determined from the output data from the device by eliminating gamma or any other correction that is performed within the device. For example, if the output data from the device has been subjected to internal gamma correction for raising to the 0.45th power, the desired luminance values can be determined by raising the output data to the (1/0.45)th power.

In a separate step, an instrument such as a desktop spectrophotometer is used to measure the individual patches on the Macbeth chart, thereby determining the target reference data $M_{ic}$ (the actual measurements on the Macbeth chart).

The reference data $M_{ic}$ may be determined in the following manner. Using a prescribed whitecard as a reference (Y=100), spectral data are obtained for each of the patches on the Macbeth chart by measurement with a spectrophotometer and these actual measurements on the Macbeth chart and the spectral data for the lighting in the scene to be imaged with the device are substituted into the following equations to calculate CIE 1931 calorimetric values XYZ. The obtained values of XYZ are transformed to colorimetric values L*a*b* by a CIE specified method. A series of the calculations involved are preferably performed automatically with a computer or the like.

$$X = k \Sigma O(\lambda) S(\lambda) \bar{x}(\lambda) \Delta \lambda$$

$$Y = k \Sigma O(\lambda) S(\lambda) \bar{y}(\lambda) \Delta \lambda$$

$$Z = k \Sigma O(\lambda) S(\lambda) \bar{z}(\lambda) \Delta \lambda$$

where $k = 100 / \Sigma S(\lambda) \bar{y}(\lambda) \Delta \lambda$ $O(\lambda)$: spectral data for each of the patches on Macbeth chart $S(\lambda)$: spectral data for the imaging light soruce $\bar{x}(\lambda)$, $\bar{y}(\lambda)$, $\bar{z}(\lambda)$: color—matching functions The CIE specified method is represented by the following equations.

$$L^* = 116 f(Y/Y_o) - 16$$

$$a^* = 500\{f(X/X_o) - f(Y/Y_o)\}$$

$$b^* = 200\{f(Y/Y_o) - f(Z/Z_o)\}$$

where $Y_o$, $Y_o$, $Z_o$: tristimulus values in the perfect reflecting diffuser. In case of $X/X_o$, $Y/Y_o$, $Z/Z_o > 0.008856$, $$L^* = 116(Y/Y_o)^{1/3} - 16$$

$$a^* = 500\{(X/X_o)^{1/3} - (Y/Y_o)^{1/3}\}$$

$$b^* = 200\{(Y/Y_o)^{1/3} - (Z/Z_o)^{1/3}\}$$

In the present invention, a commercially available desk-top spectrophotometer and various other instruments may be employed to determine the reference data $M_{ic}$. A specific example is a Spectrophotometer Model TC-1800M of Tokyo Denshoku Co., Ltd.

The spectral data for the imaging light source which are necessary to determine the reference data $M_{ic}$ may be obtained by various methods. For example, it may be obtained by measuring the spectral data of reflected light from a prescribed whitecard under the lightning with a gun-type spectrophotometer. Alternatively, spectral data may be preliminarily set for different types of lighting (e.g., daylight, an electronic flash and a tungsten lamp) and a suitable set of data is selected in accordance with the specific type of the lighting employed. If desired, known spectral data may be utilized.

In the next step, the luminance values $G_{ic}$ of the correction data are averaged and the difference $\Delta S_{ic}$ between the mean luminance and $G_{ic}$ is calculated for each of the gray patches on the gray chart. Thus, $$\Delta S_{ic} = \sum_{i=1}^{24} G_{ic}/24 - G_{ic}(= R, G, B)$$

Further, both the luminance values $D1_{ic}$ of the device data and the calculated values of the difference $\Delta S_{ic}$ are transformed to data in the same space as for the reference data $M_{ic}$ determined with a suitable instrument.

The method of transforming the luminance value $D1_{ic}$ and the difference $\Delta S_{ic}$ to data in the same space as for the reference data $M_{ic}$ may be determined as appropriate for the reference data $M_{ic}$. If the reference data $M_{ic}$ consists of colorimetric values in the $L^*a^*b^*$ color system, one will understand from the calculation formulae for the $L^*a^*b^*$ calorimetric values that the luminance value $D1_{ic}$ and the difference $\Delta S_{ic}$ can be transformed to data in the same space as for the reference data $M_{ic}$ by raising the respective values to the (⅓)th power. If the reference data $M_{ic}$ consists of calorimetric values in the XYZ color system, the luminance value $D1_{ic}$ and the difference $\Delta S_{ic}$ can be dealt with as data in the same space as for the colorimetric values and, hence, $D_{ic}$ and $\Delta S_{ic}$ may be directly used as such.

In the next step, the luminance value $D1_{ic}$ transformed to be in the same space as the reference data $M_{ic}$ is corrected by addition of the difference $\Delta S_{ic}$ to yield the corrected value $D2_{ic}$. The difference $\Delta S_{ic}$ for each of the gray patches on the gray chart imaged under the same conditions as the Macbeth chart represents the effects caused on the device data of the Macbeth chart by the imaging light source such as unevenness in the quantity of light from the light source and its position; hence, by adding the difference $\Delta S_{ic}$, those effects can be eliminated from the device data (luminance value $D1_{ic}$).

In the case under discussion, the reference data $M_{ic}$ consists of calorimeter values in the $L^*a^*b^*$ color system, so the corrected value $D2_{ic}$ can be calculated from the device data (luminance $D1_{ic}$) and the difference $\Delta S_{ic}$ by the following equation:

$$D2_{ic} = (D1_{ic}/M)^{1/3} + (\Delta S_{ic}/M)^{1/3}$$

Since the luminance value $D1_{ic}$ attributable to the output data from the device is usually digital data, the luminance $D1_{ic}$ in the first term of the right-hand side of the above equation is divided by bit-number related M so as to bring the overall scale of unity. Specifically, if the luminance $D1_{ic}$ is an 8-bit digital data, M may be taken as 255.

Further, the corrected value $D2_{ic}$ is normalized to a set value $D3_{ic}$ using reference patches for the color chart of interest. This eliminates the effect that may be caused by the expositing conditions on the measurement with the device. In the case under discussion, the Macbeth chart is used as the color chart, so all the corrected value $D2_{ic}$ are normalized to set values $D3_{ic}$ with the corrected value $D2_{ic}$ for the highlight of the gray area (i.e., the brightest gray), or the related maximal values of R, G and B, being taken as unity.

Using the thus obtained set values $D3_{ic}$ and the reference data $M_{ic}$ obtained by measurement of the respective patches on the Macbeth chart with the aforementioned desktop spectrophotometer or the like, color transforming conditions such as those in the form of a matrix or LUT are set. The method of setting the color transforming conditions is not limited in any particular way and various known methods are applicable, among which the method of least squares may be mentioned as an example.

Let us describe the case of setting a 3×3 color transforming matrix using the method of least squares. If the reference data $M_{ic}$ and the set value $D3_{ic}$ are expressed as (Ml (3(i.e. $L^*$, $a^*$, $b^*$)×24 matrix) and [D] (3 (i.e., R, G and B)×24 matrix), respectively, the desired color transforming matrix [X] (a 3×3 matrix) may be related to [M] and [D] by the following equation:

$$[M] = [X][D].$$

This equation may be solved by the method of least squares to determine the color transforming matrix [X]. Stated briefly, the color transforming matrix [X] can be determined by the following equation:

$$[X] = [M][D]^t ([D][D]^t)^{-1}$$

where t denotes the transpose of a matrix and −1 to inverse of a matrix.

If desired, better precision may be achieved by adding crossed terms such as RG, GB ad BR or square terms such as $R^2$, $G^2$ and $B^2$; alternatively, grays may be weighted in the application of the method of least squares.

In the present invention, the thus set color transforming conditions are used to perform color transformation of the image data incorporated into and outputted from image pickup devices such as a digital camera and a digital video camera. As will be apparent from the foregoing explanation, the transforming conditions are set by correcting the image device data in the scene through elimination of various effects such as the one of unevenness in the quantity of light from the lighting and the effect caused by its position.

Hence, using such conditions, highly precise color transformation can be accomplished to permit satisfactory characterization of the device.

While the color transforming method of the invention has been described above, it should be noted that the invention is by no means limited to the illustrated case and various modifications and improvements can of course be made without departing from the spirit and scope of the invention.

As described on the foreign pages, highly precise color transforming conditions in the form of a matrix, a lookup table or the like which are free from the effects the imaging source may have on the device data for a color chart due, for example, to unevenness in the quantity of light from the light source and its position can be constructed using a suitable instrument such as a desktop spectrophotometer which is capable of rapid measurements.

Using the thus constructed color transforming conditions, one can perform characterization of the device in an advantageous way.

What is claimed is:

1. A method of transforming device-taken color/density data to calorimetric values, in which said device-taken color/density data obtained by imaging with a device are transformed to calorimetric values by the steps of:

correcting device data with correction data to construct setting data, said device data being obtained by imaging with the device in the actual scene a color chart having patches formed thereon in a plurality of colors/densities, and said correction data being obtained by imaging an achromatic chart having achromatic patches formed thereon with the device under the same conditions as said color chart;

measuring said color chart with an instrument to provide reference data;

setting color transforming conditions from said reference data and said setting data for transforming the device-taken color/density data to calorimetric values; and transforming the device-taken color/density data to calorimetric values using said color transforming conditions.

2. A method according to claim 1, wherein said color chart is a Macbeth color checker.

3. A method according to claim 1, wherein said achromatic chart is a gray chart that has gray patches of the same layout and size as the color patches of the color chart and the gray patches of a uniform density formed thereon.

4. A method according to claim 1, wherein said device data and said correction data are a luminance value.

5. A method according to claim 1, wherein said instrument is a desktop spectrophotometer.

6. A method according to claim 1, wherein said reference data is determined in such a way that using a prescribed whitecard as a reference, spectral data are obtained for each of the patches on a Macbeth chart as the color chart by measurement with the instrument, the obtained spectral data and spectral data for an imaging light source in the actual scene to be imaged with the device are substituted into following equations to calculate colorimetric values XYZ, and the thus calculated calorimetric values XYZ are transformed to calorimetric values L*a*b* by a CIE specified method.

$$X = k\Sigma O(\lambda)S(\lambda)\bar{x}(\lambda)\Delta\lambda$$

$$Y = k\Sigma O(\lambda)S(\lambda)\bar{y}(\lambda)\Delta\lambda$$

$$Z = k\Sigma O(\lambda)S(\lambda)\bar{z}(\lambda)\Delta\lambda$$

where $k = 100/\Sigma S(\lambda)\bar{y}(\lambda)\Delta\lambda$ $O(\lambda)$: spectral data for each of the patches on Macbeth chart $S(\lambda)$: spectral data for the imaging light soruce $\bar{x}(\lambda)$, $\bar{y}(\lambda)$, $\bar{z}(\lambda)$: color—matching functions.

7. A method according to claim 1, wherein said color transforming condition is a color transforming matrix or a color transforming lookup table.

8. A method according to claim 1, wherein said setting step of said color transforming condition is performed using a method of least squares.

* * * * *